June 27, 1967    H. D. YANDELL    3,327,588
DEBURRING TOOL
Filed March 18, 1966
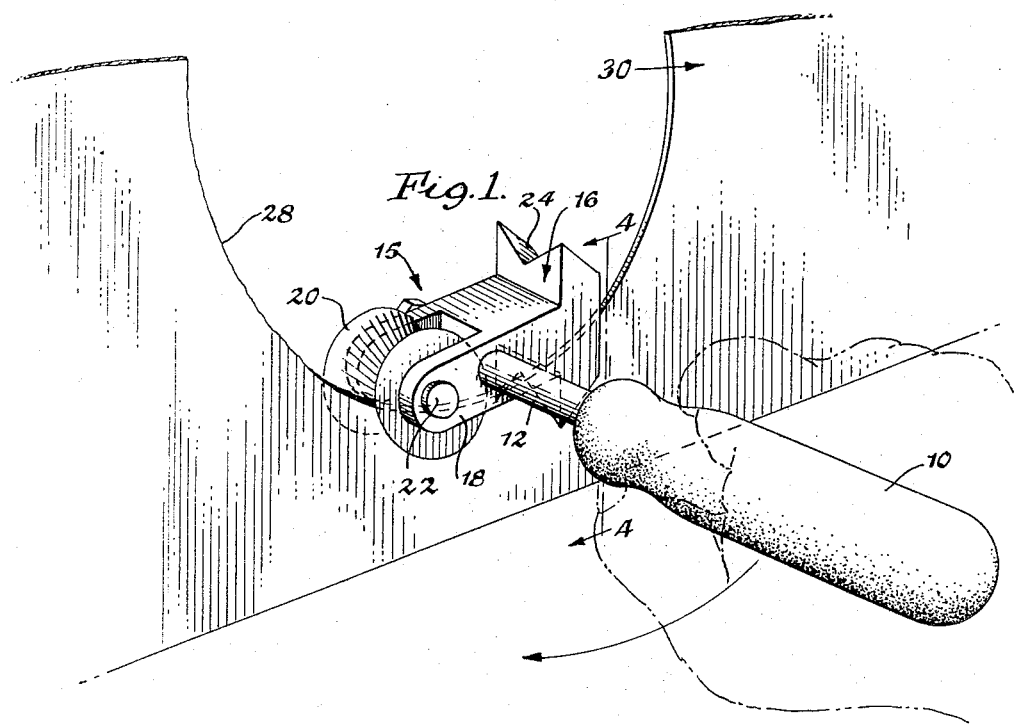
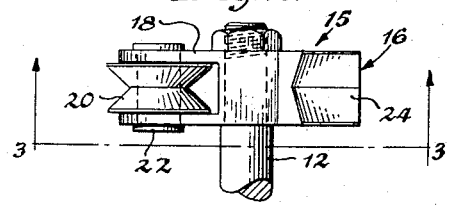
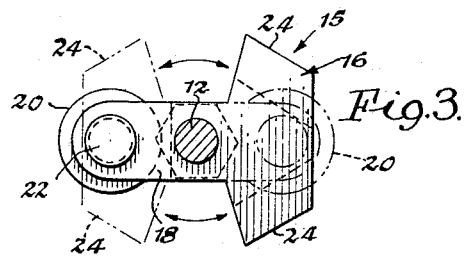
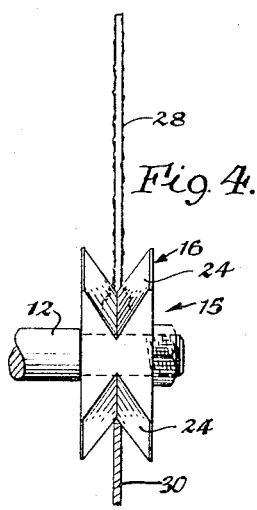
INVENTOR.
HERMAN D. YANDELL
BY
Bean, Brooks, Buckley & Bean
ATTORNEYS

United States Patent Office 3,327,588
Patented June 27, 1967

3,327,588
DEBURRING TOOL
Herman D. Yandell, Arlington, Tex., assignor to
Bell Aerospace Corporation, Wheatfield, N.Y.
Filed Mar. 18, 1966, Ser. No. 535,579
6 Claims. (Cl. 90—24)

This invention relates to an improved deburring tool, and more particularly to a hand tool as aforesaid which is adapted to use on cut-outs, or on straight or curved marginal parts of stamped sheet metal pieces, or the like.

Stamping, cutting, and other working operations on metal parts usually result in formation of rough edges or "burrs" on the marginal edges of the areas on which the operation has taken place. Such "burrs" or rough edges must usually be removed to render the parts practicable for their intended use and/or intermediate handling. Heretofore tools employed for this purpose have been subjected to certain limitations: whereby for example, exercise of inordinate care in operation of such tools in the course of the deburring operation was required, and whereby the tools of the prior art lacked a desirable degree of versatility.

It is an object of the present invention to provide a deburring tool for the purposes aforesaid which is so versatile in operation as to be adapted to deburr with equal and improved facility the edges of straight, circular, elliptical, or any irregularly shaped apertures, or any other straight or irregularly shaped edges.

It is a further object of the invention to provide an improved deburring tool as aforesaid having a working head portion which automatically swings into such position as to bear on the rough workpiece edges, regardless of the configuration thereof and regardless of the direction of movement of the tool thereagainst.

It is a still further object of this invention to provide a deburring device as aforesaid in which the burr cutting tool portion may be replaced when required, with ease and facility.

It is another object of this invention to provide a deburring tool as aforesaid which is readily usable by either right or left-handed persons.

Another object is to provide an improved deburring tool as aforesaid which simultaneously removes burrs from opposite sides or edges of a workpiece.

It is a further object of this invention to provide a tool as aforesaid which will efficiently remove burrs or rough particles from the edges of workpiece profile portions, such as apertures or curves of small diameter.

It is another object of the invention to provide an improved deburring tool as aforesaid which comprises a minimum number of parts and which is durable, safe, and relatively inexpensive to manufacture.

Other objects and advantages of the invention will be apparent from the following description, and the accompanying drawing, wherein:

FIG. 1 is a perspective view of a tool of the present invention in use on a curved cut-out portion of a work sheet;

FIG. 2 is a fragmentary plan view of the tool shown in FIG. 1;

FIG. 3 is a sectional view taken along line 3—3 of FIG. 2; and

FIG. 4 is a vertical section taken on line 4—4 of FIG. 1.

As shown herein by way of example an embodiment of the invention which is adapted to remove rough edges from work pieces of various configurations comprises a handle 10 axially bored to accommodate therein the shank portion 12 of a planetary cradle device designated generally at 15. The shank portion 12 mounts in freely rotatable relation thereon the cradle device which includes at one end a working head portion 16 and a diametrically opposed yoke portion 18 to which is secured in rotatable relationship therein a lead roller 20 as by means of an axle pin 22. The working head 16 is of hardened tool steel or the like, and is generally of T-shaped formation including a pair of V-notched convergently-directed portions 24—24, which are adapted to straddle and scrape against the workpiece edges which are to be deburred. When employed as explained hereinafter the cutting edges of the notch-shaped portions bear down on the edges of the rough workpiece when the tool is used, as shown for example in FIG. 1. Regardless of the direction of tool displacement, the cutting head will automatically rotate into operative position whenever the cutting head engages the rough edges to be deburred, as will hereinafter be explained in greater detail.

As shown in FIG. 1, the handle 10 is adapted to be manually gripped and comfortably held while guiding the planetary cradle device 15 to straddle the edge 28 of the workpiece 30 which is to be deburred. As seen more clearly in FIG. 4, the working head is disposed so as to rock about the axis of the handle shank 12 whereby to cause the notched portions 24—24 thereof to alternately straddle the edge of the workpiece. The lead roller 20 is grooved as shown in FIGS. 1, 2, to adapt the roller also to straddle the edge of the workpiece to be deburred. Thus as shown in FIG. 1, the tool of the invention may, for example, be manually drawn from right to left along the workpiece edge portion 28, in such manner that the entire planetary device bears downwardly against the workpiece edge. The lead roller 20 thereupon rides ahead of the cutting head portion 16; the then lowermost notched portion 24 of the cutting head being thereby disposed to straddle and drag along the workpiece edge, thereby shaving off any burr formations along the opposite sides thereof.

It is a particular feature of the present invention that because of the free rotatability of the cradle device 15 relative to the handle 10, the cutting head 16 will be smoothly guided over the workpiece edges regardless of the profile configuration thereof. The free rotatability of the cutting head about the handle enables the workman to use continuous strokes in drawing the edges of the cutting head over rough workpiece edges, whether the edges described a straight line; a circle; an ellipse; or any other configuration.

It is apparent from FIG. 1 that in any case of operation the opposed cutting edges of the lower-most disposed notched portion 24 bear down on the rough workpiece edges, because of the tendency of the cradle device to freely revolve about the shank 12 of the handle 10. Consequently, because of the configuration of the member 16, the cutting edges of the lowermost disposed notched portion 24 in the cutting head 16 will always bear against the rough edges of the workpiece by the mere placing of the device 15 on the rough edge of the workpiece and the exertion of a slight downward pressure on the handle 10.

It is another feature and advantage of the present invention that the tool thereof may with improved ease and facility be oscillated back and forth against a workpiece edge requiring to be deburred. For example, whereas FIG. 1 illustrates the tool being drawn from right to left across the workpiece edge, upon reciprocation of the tool in opposite direction the initial biting of the cutting head portion 16 into the workpiece edge in opposite direction will automatically cause the planetary cradle device 15 to rotate in clockwise direction on the handle shank 12 as into the solid line position thereof shown in FIG. 3; thereby disposing the lead roller 20 ahead of the cutting head 16 during the reverse motion of the tool. At this time the V-shaped cutting slot portion 24 at the opposite end of the cutting head will be disposed in operative scraping position against the workpiece edge.

Thus it will be understood that the tool of the invention may readily be oscillated back and forth against an edge requiring to be deburred without particular attention to operation of the tool; the cradle portion 15 of the device revolving automatically to accommodate any change in tool movement direction so that the roller 20 will at all times "lead" the cutting head portion of the tool; thereby stabilizing and guiding the deburring operation. This advantageous effect is attained without requiring the operator to reposition his hand relative to the tool handle. Also, it will be appreciated that both sides of the workpiece will be simultaneously deburred without repositioning of the tool in any respect.

Because of the readily detachable nature of the cutting head 15 new heads may be readily substituted therefor when the cutting edges of the tool become dull or worn out. Consequently the original handle and shaft may be used indefinitely, thereby keeping the overall tool maintenance expense at a minimum. Another advantage of the invention is that the tool thereof is equally usable by either right or left-handed persons; and that the tool of the invention is readily adapted to deburr either straight line or curved workpiece edges; or cutouts involving either long or short radii such as are not equally accessible to conventional "burr forks" or burr belts, or the like.

It is also to be understood that, although the tool of the invention has been described with reference only to metal workpieces it is equally adapted to the processing of plastic or other parts which may involve similar deburring problems. It is therefore apparent that the deburring tool of the invention is highly efficient in operation and is versatile in operation, while being composed of a minimum number of inexpensively fabricated parts; and rugged and inexpensive to maintain in operative condition. Also, although only one form of the invention has been illustrated and described in detail hereinabove, it will be understood that various changes may be made therein without departing from the spirit of the invention or the scope of the following claims. For example, whereas the drawing and description hereinabove refers to the provision of a guide "roller" 20, it will be appreciated that any other suitable frictionless type guide device may be employed in lieu thereof to lead the planetary cradle member in properly guided attitude.

I claim:

1. A deburring tool comprising a handle, a planetary cradle device rotatably mounted upon said handle and extending transversely of its axis of rotation on said handle, a guide device carried by said cradle at one end thereof and adapted to straddle the workpiece edge to be deburred and to lead said cradle device when the tool is being manually displaced to traverse a workpiece edge, and a cutting head portion carried by said planetary cradle member at its trailing end portion, said cutting head including a working edge portion adapted to scrape along both sides of the workpiece edge being processed.

2. A tool as set forth in claim 1 wherein said guide device comprises a peripherally grooved roller.

3. A tool as set forth in claim 1 wherein said working edge portion is of V-shaped form.

4. A tool as set forth in claim 2 wherein said cutting head includes a pair of oppositely directed diametrically related crotch-shaped working edge portions.

5. A tool as set forth in claim 1 wherein said guide device comprises a roller having a groove-shaped peripheral edge.

6. A tool as set forth in claim 1 wherein said cutting head includes a pair of oppositely directed V-shaped working edge portions.

No references cited.

WILLIAM W. DYER, Jr., *Primary Examiner.*

G. A. DOST, *Assistant Examiner.*